(12) United States Patent
Hiramatsu et al.

(10) Patent No.: US 12,132,361 B2
(45) Date of Patent: *Oct. 29, 2024

(54) ROTOR CORE MANUFACTURING METHOD AND ROTOR CORE MANUFACTURING SYSTEM

(71) Applicant: AISIN CORPORATION, Aichi (JP)

(72) Inventors: Tomoko Hiramatsu, Kariya (JP); Akinori Hoshino, Kariya (JP); Naotaka Hayashi, Kariya (JP); Tomoyasu Hirano, Kariya (JP)

(73) Assignee: AISIN CORPORATION, Kariya (JP)

( * ) Notice: Subject to any disclaimer, the term of this patent is extended or adjusted under 35 U.S.C. 154(b) by 269 days.

This patent is subject to a terminal disclaimer.

(21) Appl. No.: 17/625,038

(22) PCT Filed: Sep. 23, 2020

(86) PCT No.: PCT/JP2020/035757
§ 371 (c)(1),
(2) Date: Jan. 5, 2022

(87) PCT Pub. No.: WO2021/065613
PCT Pub. Date: Apr. 8, 2021

(65) Prior Publication Data
US 2022/0294322 A1 Sep. 15, 2022

(30) Foreign Application Priority Data
Sep. 30, 2019 (JP) .................. 2019-179567

(51) Int. Cl.
*H02K 15/12* (2006.01)
*B29C 45/14* (2006.01)
(Continued)

(52) U.S. Cl.
CPC ....... *H02K 15/12* (2013.01); *B29C 45/14065* (2013.01); *B29C 45/14811* (2013.01);
(Continued)

(58) Field of Classification Search
CPC .. H02K 15/12; H02K 15/03; B29C 45/14065; B29C 45/14811; B29K 2705/12; B29K 2995/0008; B29L 2031/7498; Y02T 10/64
See application file for complete search history.

(56) References Cited

U.S. PATENT DOCUMENTS

2012/0325552 A1 12/2012 Sakura
2014/0196276 A1* 7/2014 Nagai ................ H02K 15/03
29/598

(Continued)

FOREIGN PATENT DOCUMENTS

JP 2004-260881 A 9/2004
JP 2007-282392 A 10/2007
(Continued)

OTHER PUBLICATIONS

U.S. Appl. No. 17/430,975, filed Aug. 13, 2021 in the name of Tomoko Hiramatsu et al.
(Continued)

*Primary Examiner* — S. Behrooz Ghorishi
(74) *Attorney, Agent, or Firm* — Oliff PLC

(57) ABSTRACT

This rotor core manufacturing method includes a step of retracting a resin injection portion of a resin injection apparatus relative to a stacked core that remains pressed by a jig, while maintaining a resin material stored in the resin injection portion in a molten state.

12 Claims, 5 Drawing Sheets

(51) Int. Cl.
  *B29K 705/12* (2006.01)
  *B29L 31/00* (2006.01)
  *H02K 15/03* (2006.01)

(52) U.S. Cl.
  CPC .......... *H02K 15/03* (2013.01); *B29K 2705/12* (2013.01); *B29K 2995/0008* (2013.01); *B29L 2031/7498* (2013.01)

(56) References Cited

U.S. PATENT DOCUMENTS

| 2016/0181896 | A1 | 6/2016 | Masubuchi et al. |
| 2021/0194338 | A1 | 6/2021 | Ikeda et al. |
| 2021/0234440 | A1 | 7/2021 | Murayama et al. |
| 2021/0242756 | A1 | 8/2021 | Ikeda et al. |

FOREIGN PATENT DOCUMENTS

| JP | 2008-245405 | A | | 10/2008 |
| JP | 4414417 | B2 | | 2/2010 |
| JP | 4848040 | B2 | | 12/2011 |
| JP | 2012228032 | A | * | 11/2012 |
| JP | 2013162640 | A | * | 8/2013 |
| JP | 5357217 | B2 | | 12/2013 |
| JP | 5373269 | B2 | | 12/2013 |
| JP | 2014-138533 | A | | 7/2014 |
| JP | 2016-123227 | A | | 7/2016 |
| JP | 6180569 | B2 | | 8/2017 |
| JP | 6533635 | B1 | | 6/2019 |

OTHER PUBLICATIONS

Dec. 1, 2020 Search Report issued in International Patent Application No. PCT/JP2020/035757.
Jun. 16, 2020 Search Report issued in International Patent Application No. PCT/JP2020/013724.
Apr. 21, 2022 Extended Search Report issued in European Patent Application No. 20778096.6.

* cited by examiner

ROTOR CORE MANUFACTURING METHOD AND ROTOR CORE MANUFACTURING SYSTEM

TECHNICAL FIELD

The present disclosure relates to a rotor core manufacturing method and a rotor core manufacturing system.

BACKGROUND ART

Rotor core manufacturing methods are conventionally known. Such a rotor core manufacturing method and rotor core manufacturing system is disclosed in, for example, Japanese Patent No. 6180569 (JP 6180569).

In the method (a rotor core manufacturing method) disclosed in JP 6180569, a permanent magnet is inserted in each of a plurality of magnet insertion holes in a stacked rotor core in which a plurality of core pieces is stacked together, and the permanent magnet is resin-sealed in each magnet insertion hole. According to JP 6180569, resin is heated and melted, and the molten resin is supplied into the magnet insertion holes in the stacked rotor core.

Specifically, according to JP 6180569, the stacked rotor core that has the permanent magnets inserted in the magnet insertion holes are transferred above a lower die. It is noted that an upper die is set above the stacked rotor core. Next, raw materials for thermosetting resin are supplied into pots that are provided to the upper die, and the raw materials are heated by heating means. As the raw materials are heated, the viscosity thereof decreases. After that, the stacked rotor core is pressed against the upper die. Then, the raw materials that have the decreased viscosity (that have fluidized) are supplied to fill the magnet insertion holes via flow channels that are provided in the upper die and that connect the pots to the magnet insertion holes. Then, the stacked rotor core (the raw materials for thermosetting resin) is heated by heating means that are provided separately to the upper die and the lower die, so that the thermosetting resin is cured. Thus, the permanent magnets are fixed (resin-sealed) in the magnet insertion holes. Although not explicitly described in JP 6180569, the thermosetting resin may be cured by heating the raw materials that have the decreased viscosity using the heating means, while the stacked rotor core is held between the upper die and the lower die.

RELATED ART DOCUMENTS

Patent Documents

Patent Document 1: JP 6180569

SUMMARY OF THE DISCLOSURE

Problem to be Solved by the Disclosure

In the method of resin-sealing the permanent magnet in each magnet insertion hole, disclosed in JP 6180569, the thermosetting resin may be cured by being heated by the heating means provided separately to the upper die and the lower die, while the stacked rotor core is held between the upper die and the lower die. For this reason, when the thermosetting resin charged in the magnet insertion holes is cured, the thermosetting resin remaining in the flow channels that connect the pots to the magnet insertion holes may also be heated and cured. Therefore, in order to supply thermosetting resin to fill magnet insertion holes next time, it is necessary to remove the cured thermosetting resin remaining in the flow channels beforehand. That is, the removed cured thermosetting resin is incapable of being used for resin-sealing of permanent magnets. This presents a problem in that the yield (the ratio of a raw material used for resin-sealing to the quantity of a supplied raw material) of a raw material for thermosetting resin (a resin material) decreases.

The present disclosure addresses a problem like the one described above. One purpose of the present disclosure is to provide a rotor core manufacturing method and a rotor core manufacturing system that are capable of increasing the yield of a resin material.

Means for Solving the Problem

To achieve the above purpose, a rotor core manufacturing method according to a first aspect of the present disclosure includes: a step of preparing a stacked core in which a plurality of electrical steel sheets is stacked together and that has a magnet holding portion extending in a stack direction of the electrical steel sheets; a step of placing a permanent magnet in the magnet holding portion; a step of mounting the stacked core to a jig that presses the stacked core in the stack direction; a step of injecting a resin material in a molten state into the magnet holding portion by a resin injection portion that is included in a resin injection apparatus, while the stacked core remains pressed by the jig and the permanent magnet remains inserted in the magnet holding portion; a step of retracting the resin injection portion of the resin injection apparatus relative to the stacked core that remains pressed by the jig, after the step of injecting the resin material into the magnet holding portion, while maintaining the molten state of the resin material that is stored in the resin injection portion, and a step of curing the resin material in the magnet holding portion, after the step of relatively retracting the resin injection portion, by heating the stacked core that has the resin material injected in the magnet holding portion and that remains pressed by the jig.

As described above, the rotor core manufacturing method according to the first aspect includes: the step of retracting the resin injection portion of the resin injection apparatus relative to the stacked core that remains pressed by the jig, after the step of injecting the resin material into the magnet holding portion, while maintaining the molten state of the resin material stored in the resin injection portion; and the step of curing the resin material in the magnet holding portion, after the step of relatively retracting the resin injection portion, by heating the stacked core that has the resin material injected in the magnet holding portion and that remains pressed by the jig. Thus, since the resin injection portion of the resin injection apparatus is already retracted relative to the stacked core when the resin material is cured, the resin material stored in the resin injection portion does not cure. As a result, since it is not necessary to remove the resin material cured in the resin injection portion beforehand, all the resin material stored in the resin injection portion is capable of being used for fixation (resin sealing) of the permanent magnet. This allows an increase in the yield of the resin material. In addition, since the step of injecting the molten resin material by the resin injection portion while the stacked core remains pressed by the jig is included, the molten resin material is injected while clearances between the stacked electrical steel sheets are closed. Thus, leakage of the resin material from between the stacked electrical steel sheets can be suppressed. This allows a further increase in the yield of the resin material.

A rotor core manufacturing system according to a second aspect of the present disclosure is a system of manufacturing a rotor provided with a stacked core in which a plurality of electrical steel sheets is stacked together, the stacked core having a magnet holding portion extending in a stack direction of the plurality of electrical steel sheets. The system includes: a jig that presses, in the stack direction, the stacked core that has a permanent magnet in the magnet holding portion, and a resin injection apparatus that injects a resin material in a molten state into the magnet holding portion by a resin injection portion, while the stacked core remains pressed by the jig and the permanent magnet remains in the magnet holding portion. The system is structured such that the resin injection portion is retracted relative to the stacked core that remains pressed by the jig, while the resin material stored in the resin injection portion is maintained in the molten state, after injection of the resin material into the magnet holding portion, and such that the resin material in the magnet holding portion is cured by heating the stacked core that has the resin material injected in the magnet holding portion and that remains pressed by the jig.

As described above, the rotor manufacturing system according to the second aspect of the present disclosure is structured such that the resin injection portion is retracted relative to the stacked core that remains pressed by the jig, after injection of the resin material into the magnet holding portion, while the resin material stored in the resin injection apparatus is maintained in a molten state, and such that the resin material in the magnet holding portion is cured by heating the stacked core that has the resin material injected in the magnet holding portion and that remains pressed by the jig. Thus, since the resin injection portion of the resin injection apparatus is already retracted relative to the stacked core when the resin material is cured, the resin material stored in the resin injection portion does not cure. As a result, since it is not necessary to remove the resin material cured in the resin injection portion beforehand, all the resin material stored in the resin injection portion is capable of being used for fixation (resin sealing) of the permanent magnet. Therefore, it is possible to provide a rotor manufacturing system capable of increasing the yield of a resin material. In addition, since the step of injecting the molten resin material by the resin injection portion while the stacked core remains pressed by the jig is included, the molten resin material is injected while clearances between the stacked electrical steel sheets are closed. Thus, leakage of the resin material from between the stacked electrical steel sheets can be suppressed. Therefore, it is possible to provide a rotor manufacturing system capable of further increasing the yield of a resin material.

Effects of the Disclosure

The present disclosure is capable of increasing the yield of a resin material.

MODES FOR CARRYING OUT THE DISCLOSURE

Figure 1:
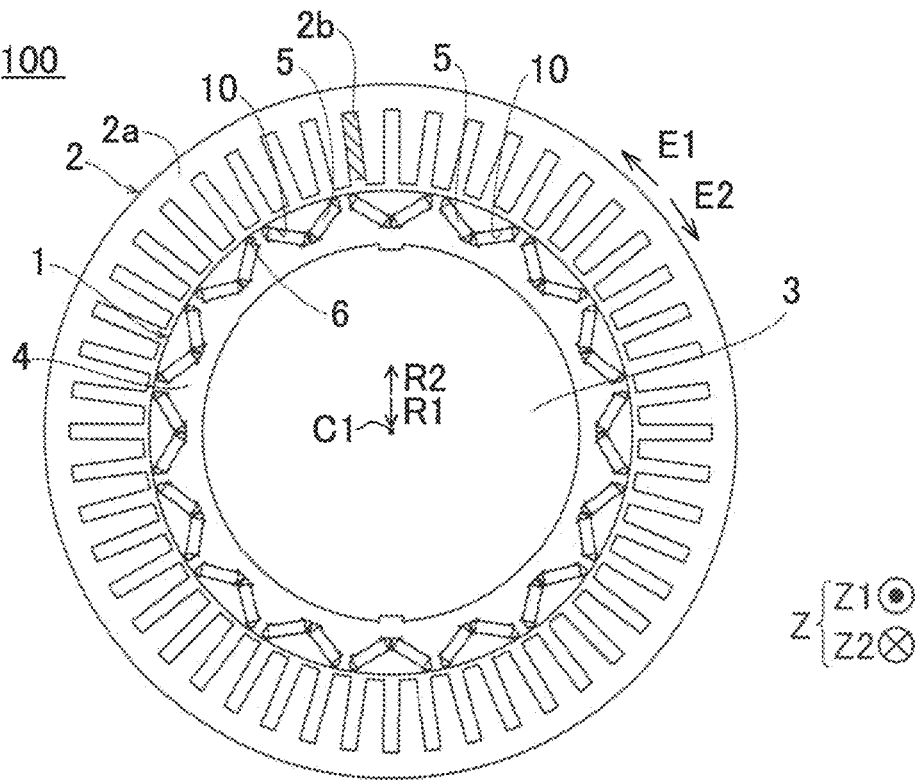
FIG. 1 is a plan view illustrating the structure of a rotor (a rotating electrical machine) according to the present embodiment.

An embodiment of the present disclosure is described below with reference to the drawings.

Present Embodiment

Referring to FIGS. 1 to 7, a manufacturing method for a rotor core 4 and a manufacturing system 200 for the rotor core 4, according to the present embodiment, are described.

In the present description, an "axial direction" refers to directions along a rotational axis C1 of a rotor 1 (the rotor core 4) and corresponds to a direction Z illustrated in the drawings. In addition, a "radial direction" refers to a radial direction (a direction R1 or a direction R2) of the rotor 1 (the rotor core 4), and a "circumferential direction" refers to a circumferential direction (a direction E1 or a direction E2) of the rotor 1 (the rotor core 4).

(Rotor Structure)

First, referring to FIG. 1, the structure of the rotor 1 according to the present embodiment is described.

As illustrated in FIG. 1, the rotor 1 and a stator 2 are annularly shaped. The rotor 1 is located radially inside the stator 2 to face the stator 2. That is, according to the present embodiment, the rotating electrical machine 100 is structured as an inner-rotor-type rotating electrical machine. A shaft 3 is located radially inside the rotor 1. The shaft 3 is coupled to, for example, an engine and an axle via a member that transmits a rotational force, such as a gear. For example, the rotating electrical machine 100 is structured as a motor, a generator, or a motor-generator and is structured to be mounted on a vehicle.

The rotor core 4 is provided with a stacked core 4d in which a plurality of electrical steel sheets 4a (refer to FIG. 3) is stacked together and that has a magnet holding portion 10 that is a through hole extending in the stack direction of the electrical steel sheets 4a. Further, the rotor core 4 is provided with a permanent magnet 5 that is inserted in the magnet holding portion 10 of the stacked core 4d. A plurality of (32 in the present embodiment) magnet holding portions 10 is provided in the rotor core 4. That is, the rotating electrical machine 100 is structured as an interior permanent magnet motor (IPM motor). Two of the magnet holding portions 10 that are adjacent to each other are arranged in a V-shape. It is noted that the arrangement of the magnet holding portions 10 is not limited to this.

Further, the stator 2 includes a stator core 2a and a coil 2b that is mounted in the stator core 2a. The stator core 2a is structured, for example, by stacking a plurality of electrical steel sheets (silicon steel sheets) together in the axial direction in such a manner as to allow magnetic flux to pass therethrough. The coil 2b is coupled to an external power supply portion and is structured to be supplied with electric power (e.g., three-phase alternating current power). The coil 2b is structured to generate a magnetic field by being supplied with electric power. The rotor 1 and the shaft 3 are structured to rotate with respect to the stator 2 together with driving of an engine or the like, even when no electric power is supplied to the coil 2b. Although FIG. 1 illustrates only part of the coil 2b, the coil 2b is mounted over the entire circumference of the stator core 2a.

The permanent magnet 5 is rectangular in cross section perpendicular to the axial direction of the rotor core 4. For example, the permanent magnet 5 is structured to have a direction of magnetization (a magnetized direction) along the short sides thereof.

Figure 3:
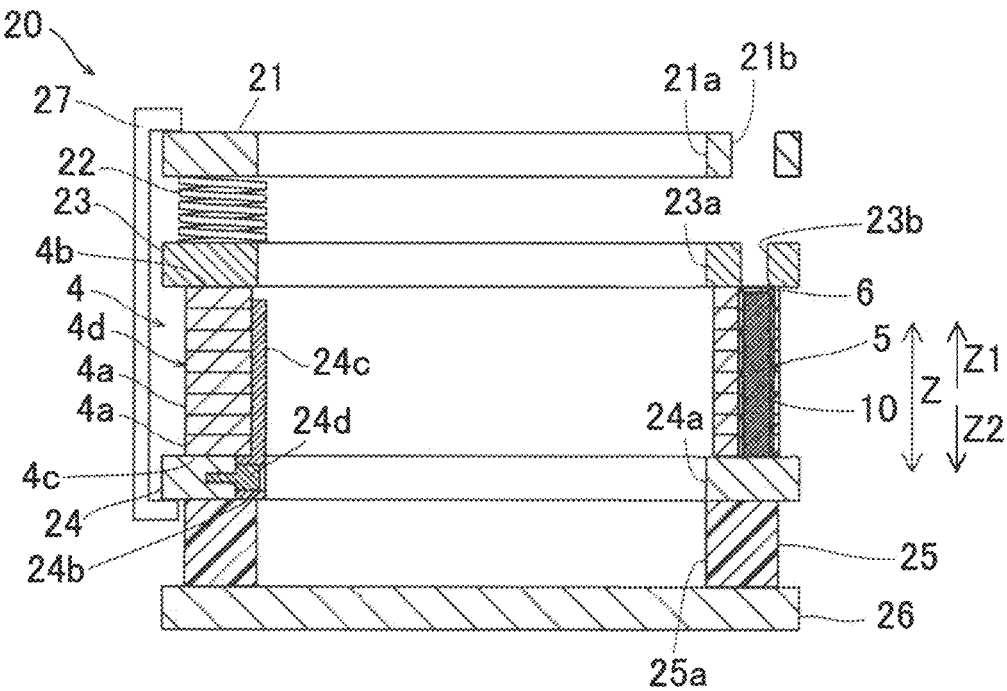
FIG. 3 is a cross-sectional view (a cross-sectional view taken along line 1000-1000 in FIG. 2) illustrating the jig that presses the stacked core and illustrating a finished rotor core mounted to the jig according to the present embodiment.

Further, as illustrated in FIG. 3, the rotor core 4 is provided with a resin material 6 that is charged in the magnet holding portions 10. The resin material 6 is provided to fix the permanent magnets 5 that are placed in the magnet holding portions 10.

(Jig Structure)

Figure 2:
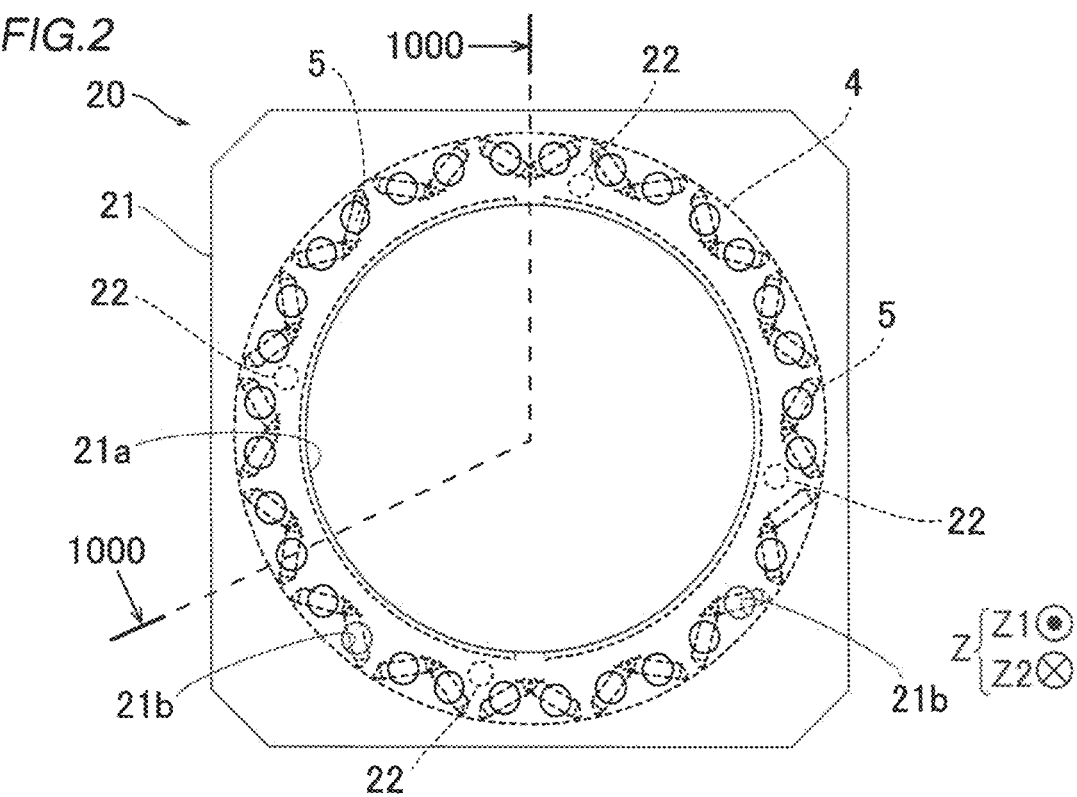
FIG. 2 is a plan view illustrating the structure of a jig (an upper plate) that presses a stacked core according to the present embodiment.
Figure 4:
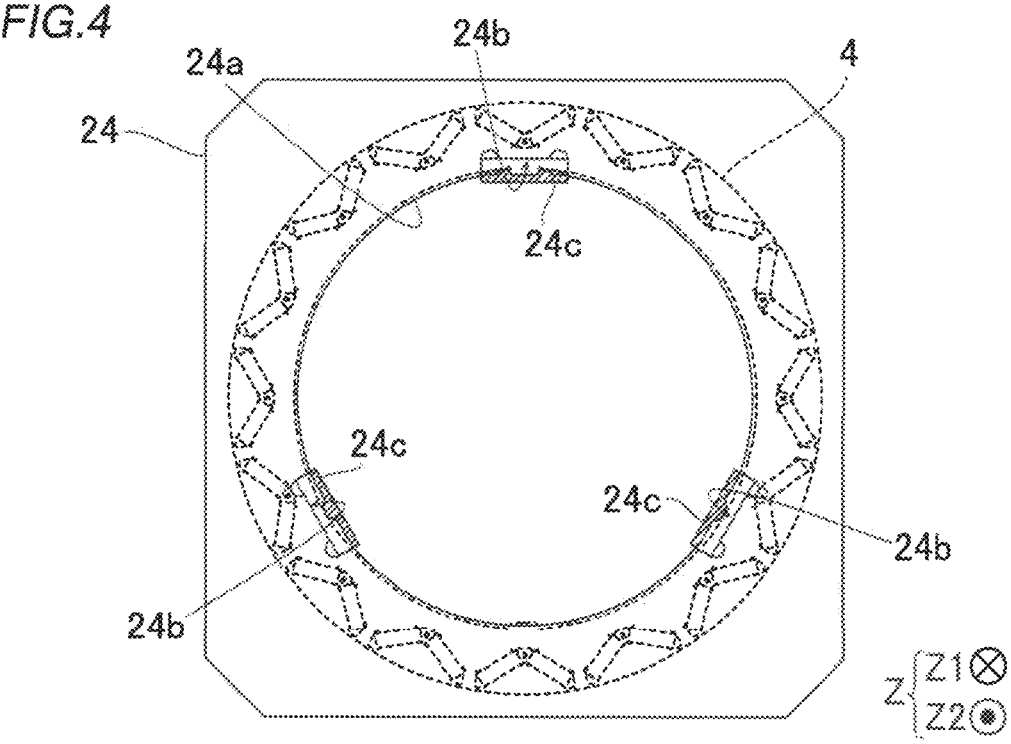
FIG. 4 is a plan view illustrating the structure of a lower plate of the jig that presses the stacked core according to the present embodiment.

Next, referring to FIGS. 2 to 4, the structure of a jig 20 according to the present embodiment is described. It is noted that the description below describes the structure of the jig 20 in a state where the stacked core 4d is already mounted to the jig 20.

As illustrated in FIG. 3, the jig 20 includes an upper plate 21, a pressing spring 22, a pressing plate 23, a lower plate 24, a thermal insulator 25, a positioning plate 26, and a clamping member 27. It is noted that the upper plate 21, the pressing plate 23, the lower plate 24, and the positioning plate 26 are all made of stainless steel (SUS).

As illustrated in FIG. 2, the upper plate 21 has a through hole 21a in the center thereof and is annularly shaped. Further, the upper plate 21 includes a plurality of resin injection holes 21b. The resin injection holes 21b are provided such that injection nozzles 122 of a resin injection apparatus 103 that is described later are insertable therein. Specifically, the resin injection holes 21b are provided in such a manner as to individually overlap the plurality of (32 in the present embodiment) magnet holding portions 10. It is noted that the resin injection holes 21b are one example of a "hole portion" recited in the claims.

As illustrated in FIGS. 2 and 3, the pressing spring 22 is provided in such a manner as to couple the upper plate 21 and the pressing plate 23 together. Specifically, a plurality of pressing springs 22 is provided at equal angular intervals in the circumferential direction when viewed in the direction of the rotational axis C1. According to the present embodiment, four pressing springs 22 are provided. Each of the plurality of pressing springs 22 is provided at a position that overlaps the stacked core 4d, when viewed from above (from the direction Z1), in a state where the stacked core 4d is already mounted to the jig 20.

Further, as illustrated in FIG. 3, the pressing plate 23 is located on a top surface 4b of the stacked core 4d. The pressing plate 23 is provided in such a manner as to press the top surface 4b of the stacked core 4d by using biasing forces of the pressing springs 22.

Further, the pressing plate 23 has a through hole 23a in the center thereof and is annularly shaped. In addition, the pressing plate 23 includes a plurality of resin injection holes 23b. The plurality of resin injection holes 23b is provided at positions that overlap the plurality of resin injection holes 21b in the upper plate 21 when viewed from above (from the direction Z1). It is noted that the resin injection holes 23b are one example of the "hole portion" recited in the claims.

The stacked core 4d is placed (put) on the lower plate 24. That is, the lower plate 24 is in contact with a bottom surface 4c of the stacked core 4d. The lower plate 24 has a through hole 24a in the center thereof and is annularly shaped. Further, the lower plate 24 includes a plurality of (three in the present embodiment) cut portions 24b. The plurality of cut portions 24b is provided on the inner circumference of the through hole 24a at almost equal angular intervals (refer to FIG. 4) in the circumferential direction when viewed in the direction of the rotational axis C1.

The plurality of cut portions 24b is provided with L-shaped positioning portions 24c. The radial and circumferential positions of the stacked core 4d relative to the lower plate 24 are decided by the plurality of positioning portions 24c. The positioning portions 24c are fixed (fastened) by fastening bolts 24d to the lower plate 24.

Further, the thermal insulator 25 is provided in such a manner as to be held between the lower plate 24 and the positioning plate 26. The thermal insulator 25 has a through hole 25a in the center thereof and is annularly shaped. In addition, the thermal insulator 25 is made of resin.

The positioning plate 26 is provided below the lower plate 24 (in the direction Z2).

The clamping member 27 has a U-shape and is provided in such a manner as to clamp the upper plate 21 and the lower plate 24 together. Thus, the stacked core 4d is held and pressed between the upper plate 21 and the lower plate 24 in a vertical direction (in the direction Z). Specifically, the upper plate 21 holds and presses the stacked core 4d indirectly via the pressing plate 23 in conjunction with the lower plate 24. As a result, the stacked core 4d is fixed to the jig 20. A plurality of (four in the present embodiment) clamping members 27 is provided. The plurality of clamping members 27 is provided at almost equal angular intervals (i.e., at intervals of 90 degrees) in the circumferential direction when viewed in the direction of the rotational axis C1.

(Rotor Core Manufacturing System)

Figure 5:
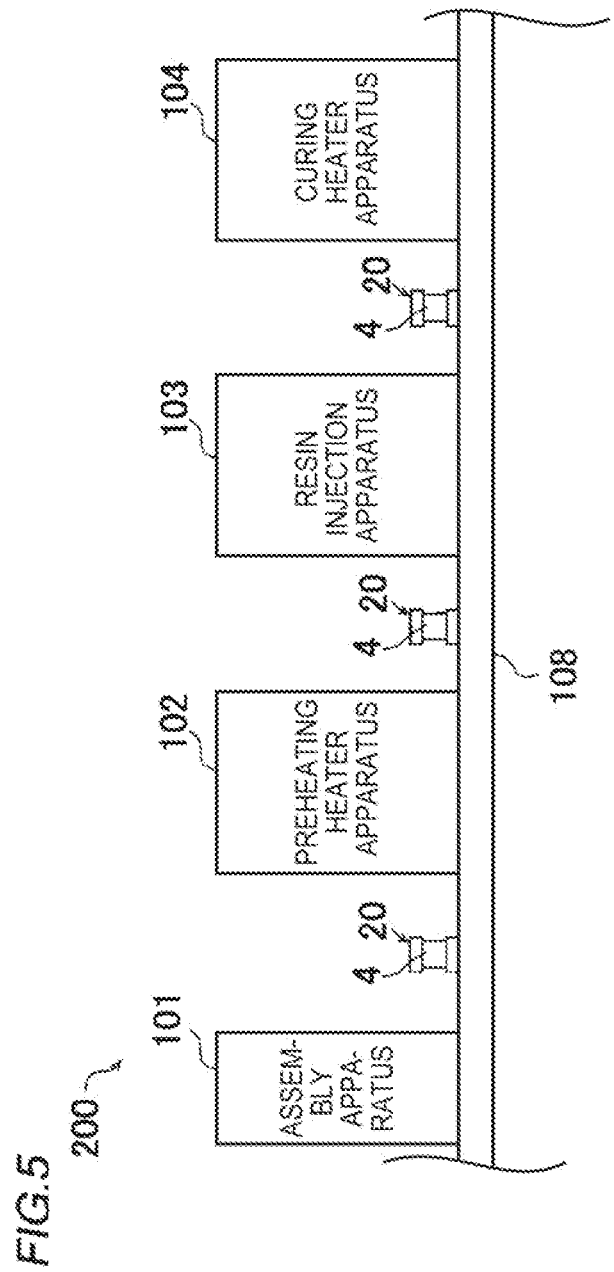
FIG. 5 is a schematic diagram illustrating the structure of a rotor core manufacturing system according to the present embodiment.

Next, referring to FIG. 5, a manufacturing system 200 for the rotor core 4 is described.

As illustrated in FIG. 5, the manufacturing system 200 for the rotor core 4 is provided with an assembly apparatus 101, a preheating heater apparatus 102, the resin injection apparatus 103, and a curing heater apparatus 104. Further, the manufacturing system 200 for the rotor core 4 is provided with a transfer conveyor 108 that transfers the stacked core 4d. It is noted that the assembly apparatus 101, the preheating heater apparatus 102, the resin injection apparatus 103, and the curing heater apparatus 104 are apparatuses that are separate from each other.

The assembly apparatus 101 is structured to mount (assemble) the stacked core 4d to the jig 20. Specifically, the assembly apparatus 101 is structured to mount the stacked core 4d to the jig 20 and to mount the permanent magnets 5 in the magnet holding portions 10.

The preheating heater apparatus 102 is structured to perform preheating by heating the stacked core 4d. Specifically, the preheating heater apparatus 102 is structured to perform preheating by heating the stacked core 4d that remains mounted to the jig 20 at a temperature that is greater than or equal to a first temperature T1 (e.g., 50° C.) and less than a second temperature T2 (e.g., 120° C.). It is noted that the first temperature T1 is a temperature at which the resin material 6 melts (a temperature at which the melting starts). On the other hand, the second temperature T2 is a temperature at which the resin material 6 cures (thermally cures) (a temperature at which the curing (the thermal curing) starts) and that is greater than the first temperature T1.

The resin injection apparatus 103 is structured to inject the resin material 6 into the magnet holding portions 10. Specifically, the resin injection apparatus 103 is structured to inject the resin material 6 that has been melted at the first temperature T1 or greater into the magnet holding portions 10, while the stacked core 4d remains mounted to the jig 20 and the permanent magnets 5 remain inserted in the magnet holding portions 10. Details of the structure of the resin injection apparatus 103 are described later.

The curing heater apparatus 104 is structured to cure the resin material 6 in the magnet holding portions 10 by heating the stacked core 4d. Specifically, the curing heater apparatus 104 is structured to cure the resin material 6 in the magnet holding portions 10 by heating the stacked core 4d that remains mounted to the jig 20 and that has the resin material 6 injected in the magnet holding portions 10, at a temperature greater than or equal to the second temperature T2 that is a temperature at which the resin material 6 cures.

[Specific Structure of Resin Injection Apparatus]

Figure 6:
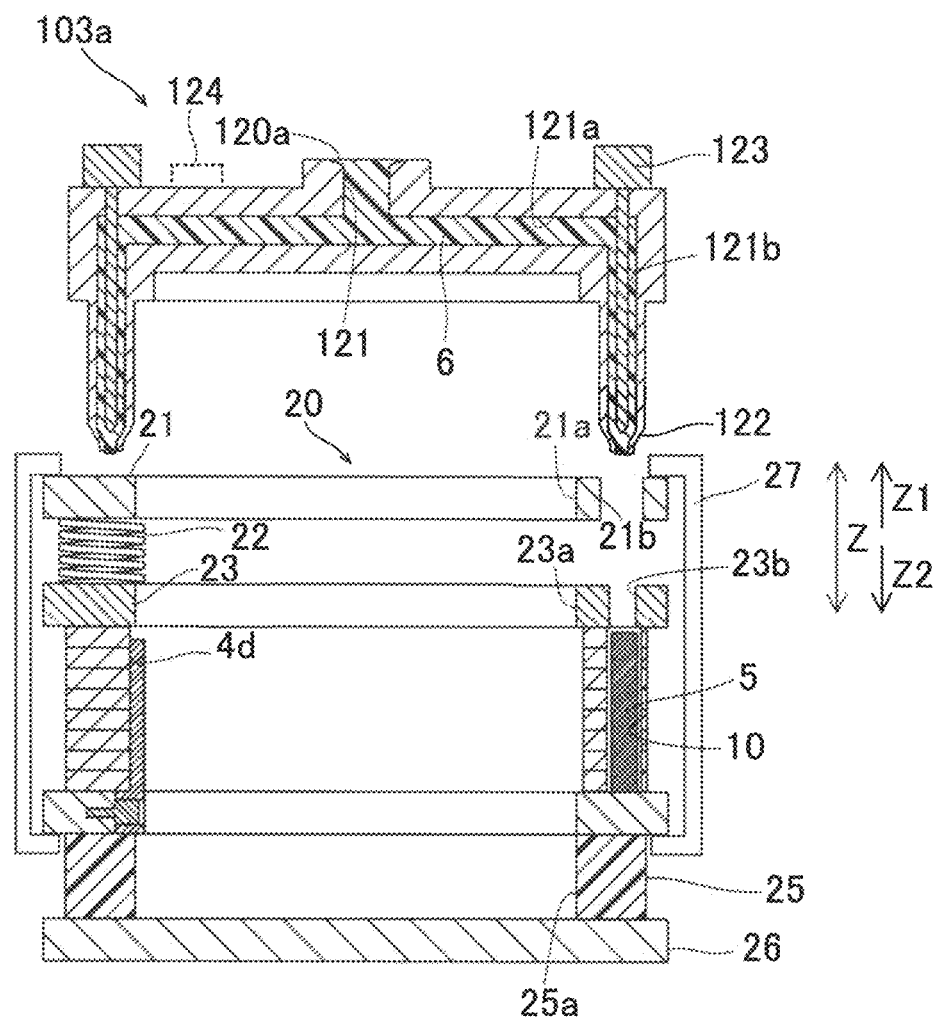
FIG. 6 is a cross-sectional view used to describe a resin injection portion according to the present embodiment.

Next, referring to FIG. 6, the specific structure of the resin injection apparatus 103 is described.

As illustrated in FIG. 6, the resin injection apparatus 103 includes a resin injection portion 103a.

Here, according to the present embodiment, the resin material 6 is structured to melt at the first temperature T1 and to cure at the second temperature T2 greater than the first temperature T1. For example, a resin material 6 (synthetic resin material) such as disclosed in Japanese Unexamined Patent Application Publication No. 2000-239642 (JP 2000-239642 A) may be used. That is, the resin material 6 includes a reactive hot melt adhesive composition that contains 10% to 100% of a first compound having at least 100 eq/T of uretdione rings, 0% to 90% of a second compound having active hydrogen groups at molecular ends, and 0% to 90% of a third compound having glycidyl groups, and the reactive hot melt adhesive composition is characterized in that none of the first to third compounds have isocyanate groups at molecular ends. The resin material 6 disclosed in JP 2000-239642 A is solid (in the form of flakes, pellets, powder, etc.) at ordinary temperatures, but melts (softens) when heated until the temperature of the resin material 6 reaches the first temperature T1. Further, this resin material 6 does not cure while it is maintained at the first temperature T1. On the other hand, this resin material 6 cures when it reaches the second temperature T2 greater than the first temperature T1.

As illustrated in FIG. 6, a flow channel 121 where the resin material 6 flows is provided within the resin injection portion 103a. The flow channel 121 branches into a plurality of flow channels 121a toward the stacked core 4d. Flow channels 121b of the flow channel 121 on the side closer to the stacked core 4d are provided at positions corresponding to the magnet holding portions 10 of the stacked core 4d.

Further, the resin injection portion 103a is provided with the injection nozzles 122. The injection nozzles 122 are provided on the distal-end side (the flow channels 121b) of the flow channel 121. The resin material 6 stored in the flow channel 121 is injected into the magnet holding portions 10 of the stacked core 4d from the injection nozzles 122 of the resin injection portion 103a.

Additionally, as illustrated in FIG. 6, the flow channels 121b are provided with stop valves 123. When the resin material 6 is pushed out of the injection nozzles 122, the stop valves 123 change to an open state. On the other hand, when the resin material 6 is not pushed out of the injection nozzles 122, the stop valves 123 change to a closed state. It is noted that the stop valves 123 are one example of an "interrupting portion" recited in the claims.

Further, a heating device 124 is provided outside the resin injection portion 103a. The heating device 124 heats the resin injection portion 103a such that the temperature of the resin material 6 stored within the resin injection portion 103a reaches the first temperature T1.

(Rotor Core Manufacturing Method)

Figure 7:
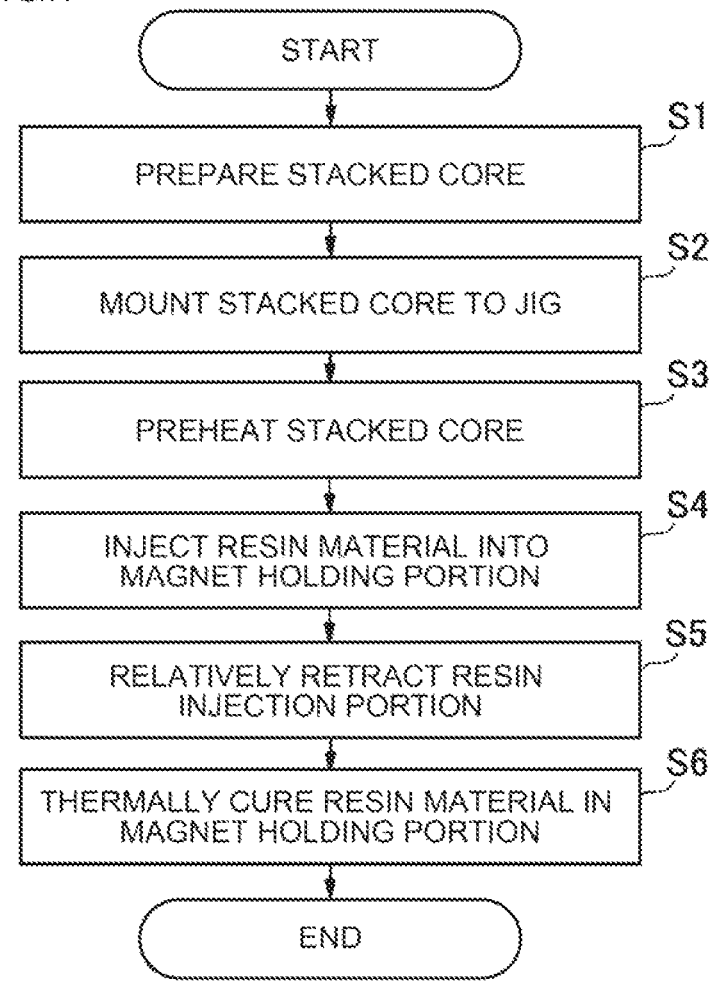
FIG. 7 is a flowchart illustrating a rotor core manufacturing method according to the present embodiment.

Next, referring to FIG. 7, the manufacturing method for the rotor core 4 is described.

First, as illustrated in FIG. 7, in step S1, a step of preparing the stacked core 4d is performed. Specifically, the stacked core 4d is formed by stacking a plurality of electrical steel sheets 4a together. At this time, the magnet holding portions 10 that extend in the stack direction of the electrical steel sheets 4a are formed in the stacked core 4d by press working.

Then, in step S2, steps of mounting the stacked core 4d to the jig 20 are performed in the assembly apparatus 101. In these steps, the stacked core 4d is mounted to the jig 20 such that the stacked core 4d is held and pressed in the vertical direction (in the direction Z) between the upper plate 21 (the pressing plate 23) and the lower plate 24. Specifically, first, a step of placing (putting) the stacked core 4d on the lower plate 24 is performed. Next, a step of placing the permanent magnets 5 in the magnet holding portions 10 are performed while the stacked core 4d remains on the lower plate 24. Then, the lower plate 24 and the upper plate 21 are clamped (coupled) together by the clamping member 27 so that the top surface 4b of the stacked core 4d is pressed by the pressing plate 23. It is noted that the steps of mounting the stacked core 4d to the jig 20 (the steps in step S2) are steps of mounting the stacked core 4d to the jig 20 that is provided with the thermal insulator 25.

Next, in step S3, a step of preheating the stacked core 4d is performed. Specifically, the preheating heater apparatus 102 performs the preheating step by heating the stacked core 4d that remains mounted to the jig 20, at the temperature that is greater than or equal to the first temperature T1 and less than the second temperature T2.

Next, in step S4, a step of injecting the resin material 6 into the magnet holding portions 10 is performed. Specifically, according to the present embodiment, the resin injection portion 103a included in the resin injection apparatus 103 injects the resin material 6 that is in a molten state into the magnet holding portions 10, while the stacked core 4d remains pressed by the jig 20 and the permanent magnets 5 remain inserted in the magnet holding portions 10. Specifically, the resin material 6 that is in a molten state is injected while the temperature of the resin material 6 is greater than or equal to the first temperature T1 and less than the second temperature T2. It is noted that in the step of injecting the resin material 6, the resin material 6 that is solid at ordinary temperatures is melted at the first temperature T1, and then the molten resin material 6 is injected into the magnet holding portions 10.

Specifically, as illustrated in FIG. 6, the resin injection portion 103a is stationary. The stacked core 4d that remains pressed by the jig 20 is moved up toward the resin injection portion 103a that remains stationary. Next, the injection nozzles 122 of the resin injection portion 103a are inserted into the magnet holding portions 10 that have the permanent magnets 5 therein. Then, the stop valves 123 are changed to the open state so that the resin material 6 is supplied to fill the magnet holding portions 10. After the filling of the magnet holding portions 10 with the resin material 6 is finished, the stop valves 123 are changed to a closed state.

Further, according to the present embodiment, in the step of injecting the resin material 6, the resin material 6 is injected into the magnet holding portions 10 while pressure is applied to the resin material 6. As the magnet holding portions 10 are filled with the resin material 6, the pressure applied to the resin material 6 increases above a predetermined threshold. After the increased pressure is maintained for a predetermined period of time, the injection of the resin material 6 is stopped. For example, after the pressure applied to the resin material 6 increases above the predetermined threshold (e.g., about 8.5 Mpa), the increased pressure is maintained for about five seconds. It is noted that of all the resin material 6 stored in the resin injection portion 103a, only the necessary amount of the resin material 6 is injected directly into the magnet holding portions 10. The resin material 6 may be injected into the magnet holding portions 10 while the tips of the injection nozzles 122 are in abutment with the stacked core 4d. Alternatively, the resin material 6 may be injected into the magnet holding portions 10 while the tips pf the injection nozzles 122 are in abutment with the jig 20 (while the injection nozzles 122 are separated from the stacked core 4d).

Further, according to the present embodiment, in the step of injecting the resin material 6, the resin material 6 is injected by the resin injection portion 103a into the magnet holding portions 10 through the resin injection holes 21b and the resin injection holes 23b provided in the jig 20 that presses the stacked core 4d. Specifically, the injection nozzles 122 of the resin injection portion 103a are inserted through the resin injection holes 21b and the resin injection holes 23b. Then, the resin material 6 is injected into the magnet holding portions 10 from the injection nozzles 122 inserted through the resin injection holes 21b and the resin injection holes 23b. That is, according to the present embodiment, in the step of injecting the resin material 6, the resin material 6 is injected into the magnet holding portions 10 from above.

Furthermore, according to the present embodiment, in the step of injecting the resin material 6, the molten resin material 6 that is in a molten state is injected into the magnet holding portions 10 while the stacked core 4d remains mounted to the jig 20 that is provided with the thermal insulator 25. Thus, the thermal insulator 25 suppresses the transfer of heat of the resin material 6 to the positioning plate 26 of the jig 20.

It is noted here that according to the present embodiment, in step S5 (refer to FIG. 7) after the step of injecting the resin material 6 into the magnet holding portions 10, the resin injection portion 103a of the resin injection apparatus 103 is retracted relative to the stacked core 4d that remains pressed by the jig 20, while the resin material 6 stored in the resin injection portion 103a is maintained in a molten state. That is, the resin injection portion 103a is retracted relative to the stacked core 4d while the heating is maintained such that the temperature of the resin material 6 stored in the resin injection portion 103a is equal to the first temperature T1.

Further, according to the present embodiment, in the step of relatively retracting the resin injection portion 103a after the resin material 6 is injected by the resin injection portion 103a into the magnet holding portions 10, the resin injection portion 103a is relatively retracted while the stop valves 123 provided to the resin injection portion 103a interrupt the injection of the resin material 6 from the resin injection portion 103a (i.e., while the stop valves 123 are in a closed state). Furthermore, in the step of relatively retracting the resin injection portion 103a, the resin injection portion 103a is relatively retracted while the pressure applied to the resin material 6 is less than the pressure that is applied to the resin material 6 in the step of injecting the resin material 6.

Further, according to the present embodiment, in the step of relatively retracting the resin injection portion 103a, the resin injection portion 103a is relatively retracted by moving the stacked core 4d away from the resin injection portion 103a. In other words, the resin injection portion 103a is moved away relative to the stacked core 4d, without moving the resin injection portion 103a, by moving down the stacked core 4d away from the resin injection portion 103a.

Next, as illustrated in FIG. 7, in step S6 after the step of relatively retracting the resin injection portion 103a, the resin material 6 in the magnet holding portions 10 is cured by heating the stacked core 4d that has the resin material 6 injected in the magnet holding portions 10 and that remains pressed by the jig 20. Specifically, the resin material 6 in the magnet holding portions 10 is cured by heating the stacked core 4d that has the resin material 6 injected in the magnet holding portions 10 and that remains pressed by the jig 20, at a temperature greater than or equal to the second temperature T2 at which the resin material 6 cures. According to the present embodiment, in the step of curing the resin material 6 in the magnet holding portions 10, the resin material 6 in the magnet holding portions 10 is cured by the curing heater apparatus 104 that is provided separately from the resin injection apparatus 103.

Effects of Present Embodiment

The present embodiment provides the following effects.

As described above, the present embodiment includes: a step of retracting the resin injection portion (103a) of the resin injection apparatus (103) relative to the stacked core (4d) that remains pressed by the jig (20), after the step of injecting the resin material (6) into the magnet holding portion (10), while maintaining the molten state of the resin material (6) that is stored in the resin injection portion (103a), and a step of curing the resin material (6) in the magnet holding portion (10), after the step of relatively retracting the resin injection portion (103a), by heating the stacked core (4d) that has the resin material (6) injected in the magnet holding portion (10) and that remains pressed by the jig (20). Thus, since the resin injection portion (103a) of the resin injection apparatus (103) is already retracted relative to the stacked core (4d) when the resin material (6) is cured, the resin material (6) stored in the resin injection portion (103a) does not cure. As a result, since it is not necessary to remove the resin material (6) cured in the resin injection portion (103a) beforehand, all the resin material (6) stored in the resin injection portion (103a) is capable of being used for fixation (resin sealing) of a permanent magnet (5). This allows an increase in the yield of the resin material (6). In addition, since the step of injecting the molten resin material (6) by the resin injection portion (103a) while the stacked core (4d) remains pressed by the jig (20) is included, the molten resin material (6) is injected while clearances between stacked electrical steel sheets (4a) are closed. Thus, leakage of the resin material (6) from between the stacked electrical steel sheets (4a) can be suppressed. This allows a further increase in the yield of the resin material (6).

According to the present embodiment, as described above, the step of injecting the resin material (6) is a step of injecting the resin material (6) in the molten state into the magnet holding portion (10) by the resin injection portion (103a) while a temperature of the resin material (6) is greater than or equal to a first temperature (T1) and less than a second temperature (T2) that is greater than the first temperature (T1), and the resin material (6) is configured to melt at the first temperature (T1) and configured to cure at the second temperature (T2). Further, the step of curing the resin material (6) is a step of curing the resin material (6) in the magnet holding portion (10) by heating the stacked core (4d) that has the resin material (6) injected in the magnet holding portion (10) and that remains pressed by the jig (20), at the second temperature (T2) or greater, the second temperature (T2) being a temperature at which the resin material (6) cures. Thus, since the resin material (6) melts at the first temperature (T1) and cures at the second temperature (T2) greater than the first temperature (T1), it is possible to prevent the resin material (6) that has a temperature greater than or equal to the first temperature (T1) and less than the second temperature (T2) from being cured during the step of injecting the resin material (6). In addition, by heating the stacked core (4d) that has the injected resin material (6) at the second temperature (T2) or greater, it is possible to surely cure the molten resin material (6).

Further, according to the present embodiment, as described above, the step of curing the resin material (6) in the magnet holding portion (10) is a step of curing the resin material (6) in the magnet holding portion (10) by heating the stacked core (4d) at the second temperature (T2) or greater in a curing heater apparatus (104) that is provided separately from the resin injection apparatus (103). According to this structure, since the resin material (6) in the magnet holding portion (10) is cured by the curing heater apparatus (104) that is provided separately from the resin injection apparatus (103), it is possible to surely prevent the resin material (6) stored in the resin injection portion (103a) from being cured. Further, if the resin injection apparatus (103) is used also to cure the resin material (6), the resin injection apparatus (103) is occupied also during the curing of the resin material (6). The above structure permits the resin injection apparatus (103) to be unoccupied during the curing of the resin material (6), thus allowing efficient manufacturing of a rotor (1).

Further, according to the present embodiment, as described above, the step of injecting the resin material (6) is a step of melting the resin material (6) that is solid at ordinary temperatures at the first temperature (T1), and is a step of injecting the resin material (6) in the molten state into the magnet holding portion (10). This structure enables the resin injection apparatus (103) to continuously perform melting of the solid resin material (6) and injection of the molten resin material (6) into the magnet holding portion (10) without transferring the resin material (6) that is melted in another apparatus to the resin injection apparatus (103), thus allowing a reduction in the time required to manufacture the rotor (1).

Further, according to the present embodiment, as described above, the step of injecting the resin material (6) is a step of injecting the resin material (6) into the magnet holding portion (10) while applying pressure to the resin material (6) such that the pressure applied to the resin material (6) increases above a predetermined threshold as a result of filling the magnet holding portion (10) with the resin material (6), and is a step of stopping injection of the resin material (6) after maintaining the increased pressure for a predetermined period of time. It is noted here that the resin material (6) may have some bubbles therein. In this case, if the injection of the resin material (6) is stopped at the instance when the pressure applied to the resin material (6) increases above the predetermined threshold, the bubbles remain trapped in the resin material (6) and reduce the strength of the cured resin material (6) (the sealing strength of the permanent magnet (5)). For this reason, as described above, the injection of the resin material (6) is stopped, after the pressure applied to the resin material (6) increases above the predetermined threshold and the increased pressure is maintained for the predetermined period of time. Thus, the amount of bubbles remaining in the resin material (6) can be decreased. This allows an increase in the strength of the cured resin material (6) (the sealing strength of the permanent magnet (5)).

Further, according to the present embodiment, as described above, the step of injecting the resin material (6) is a step of injecting the resin material (6) into the magnet holding portion (10) by the resin injection portion (103a) through a hole portion (21b, 23b) provided in the jig (20) that presses the stacked core (4d). This structure allows easy injection of the resin material (6) into the magnet holding portion (10) through the hole portion (21b, 23b) provided in the jig (20) while maintaining the stacked core (4d) pressed by the jig (20).

Further, according to the present embodiment, as described above, the step of mounting the stacked core (4d) to the jig (20) is a step of mounting the stacked core (4d) to the jig (20) that is provided with a thermal insulator (25), and the step of injecting the resin material (6) is a step of injecting the resin material (6) in the molten state into the magnet holding portion (10) while the stacked core (4d) remains mounted to the jig (20) provided with the thermal insulator (25). This structure enables the thermal insulator (25) to prevent the temperature (the first temperature (T1)) of the molten resin material (6) from transferring to the jig (20).

Further, according to the present embodiment, as described above, the step of relatively retracting the resin injection portion (103a) is a step of relatively retracting the resin injection portion (103a) while interrupting the injection of the resin material (6) from the resin injection portion (103a) by an interrupting portion (123) that is provided to the resin injection portion (103a), after injecting the resin material (6) into the magnet holding portion (10) by the resin injection portion (103a). This structure enables the interrupting portion (123) to prevent leakage of the resin material (6) from the resin injection portion (103a) when the resin injection portion (103a) is relatively retracted. As a result, a further increase in the yield of the resin material (6) is possible.

Further, according to the present embodiment, as described above, the step of injecting the resin material (6) is a step of injecting the resin material (6) into the magnet holding portion (10) while applying pressure to the resin material (6), and the step of relatively retracting the resin injection portion (103a) is a step of relatively retracting the resin injection portion (103a) while pressure applied to the resin material (6) is less than the pressure that is applied to the resin material (6) in the step of injecting the resin material (6). This structure lowers the pressure applied to the resin material (6) during the relative retraction of the resin injection portion (103a), thus allowing further prevention of the leakage of the resin material (6) from the resin injection portion (103a) during the relative retraction of the resin injection portion (103a). As a result, a still further increase in the yield of the resin material (6) is possible.

Further, according to the present embodiment, as described above, the step of relatively retracting the resin injection portion (103a) is a step of relatively retracting the resin injection portion (103a) by moving the stacked core (4d) away from the resin injection portion (103a). It is noted here that the temperature of the resin injection portion (103a) (a second portion (120)) is controlled to maintain the resin material (6) in a molten state. Moving the resin injection portion (103a) makes it difficult to control the temperature of the resin injection portion (103a) (may cause temperature fluctuations). For this reason, the above structure does not move the resin injection portion (103a) (a second portion (120)), thus allowing easy control of the temperature of the resin injection portion (103a).

Further, according to the present embodiment, as described above, the step of injecting the resin material (6) is a step of injecting the resin material (6) into the magnet holding portion (10) from above, and the step of relatively retracting the resin injection portion (103a) is a step of relatively retracting the resin injection portion (103a) by moving down the stacked core (4d) away from the resin injection portion (103a). It is assumed here that the resin material (6) is injected into the magnet holding portion (10) from below. In this case, when the resin injection portion (103a) is retracted from the magnet holding portion (10), the resin material (6) leaks from the magnet holding portion (10) after the injection of the resin material (6). Therefore, a cover is required in order for the resin material (6) not to leak from the magnet holding portion (10). In contrast, when the resin material (6) is injected into the magnet holding portion (10) from above as described above, the resin material (6) does not leak from the magnet holding portion (10) after the injection of the resin material (6). This allows easy relative retraction of the resin injection portion (103a) from the magnet holding portion (10).

Further, according to the present embodiment, as described above, the step of mounting the stacked core (4d) to the jig (20) is a step of mounting the stacked core (4d) to the jig (20) such that the stacked core (4d) is held and pressed in a vertical direction between an upper plate (21) that is included in the jig (20) and a lower plate (24) that is included in the jig (20). This ensures that the stacked core (4d) is held and pressed between the upper plate (21) and the lower plate (24), thus allowing stable fixation of the stacked core (4d) to the jig (20).

Modifications

The embodiment disclosed above is to be considered in all respects as illustrative and not restrictive. The scope of the present disclosure is defined by the claims, not the description of the above embodiment, and includes all changes (modifications) that fall within the scope of the claims and the equivalents thereof.

For example, although the above embodiment illustrates by example that the resin material 6 in the magnet holding portions 10 is cured by the curing heater apparatus 104 that is provided separately from the resin injection apparatus 103, the present disclosure is not limited to this. For example, the resin material 6 in the magnet holding portions 10 may be cured by heating the stacked core 4d in the resin injection apparatus 103 (without transfer of the stacked core 4d from the resin injection apparatus 103).

Further, although the above embodiment illustrates by example that the stacked core 4d is mounted to the jig 20 in the assembly apparatus 101, the present disclosure is not limited to this. For example, the stacked core 4d may be mounted to the jig 20 in the resin injection apparatus 103 (at a location where the resin injection apparatus 103 is installed).

In addition, although the above embodiment illustrates by example that in the step of injecting the resin material 6, the injection of the resin material 6 is stopped after the pressure applied to the resin material 6 increases above a predetermined threshold and the increased pressure is maintained for about five seconds, the present disclosure is not limited to this. For example, the period of time for which the increased pressure is maintained may be less than five seconds. For example, it may be greater than or equal to about one second and less than or equal to about two seconds.

Further, although the above embodiment illustrates by example that the resin material 6 is injected into the magnet holding portions 10 from above, the present disclosure is not limited to this. For example, the resin material 6 may be injected into the magnet holding portions 10 from below.

Furthermore, although the embodiment illustrates by example that the resin injection portion 103a is relatively retracted by moving down the stacked core 4d away from the resin injection portion 103a, the present disclosure is not limited to this. For example, the resin injection portion 103a may be relatively retracted by moving up the resin injection portion 103a away from the stacked core 4d.

DESCRIPTION OF THE REFERENCE NUMERALS

4: ROTOR CORE
4a: ELECTRICAL STEEL SHEET
4d: STACKED CORE
5: PERMANENT MAGNET
6: RESIN MATERIAL
10: MAGNET HOLDING PORTION
20: JIG
21: UPPER PLATE
21b, 23b: RESIN INJECTION HOLE (HOLE PORTION)
24: LOWER PLATE
103: RESIN INJECTION APPARATUS
103a: RESIN INJECTION PORTION
104: CURING HEATER APPARATUS
123: STOP VALVE (INTERRUPTING PORTION)
200: MANUFACTURING SYSTEM
T1: FIRST TEMPERATURE
T2: SECOND TEMPERATURE.

The invention claimed is:
1. A rotor core manufacturing method comprising:
a step of preparing a stacked core in which a plurality of electrical steel sheets is stacked together and that has a magnet holding portion extending in a stack direction of the plurality of electrical steel sheets;
a step of placing a permanent magnet in the magnet holding portion;
a step of mounting the stacked core to a jig that presses the stacked core in the stack direction;
a step of injecting a resin material in a molten state into the magnet holding portion by a resin injection portion that is included in a resin injection apparatus, while the stacked core remains pressed by the jig and the permanent magnet remains inserted in the magnet holding portion, wherein the resin material is in the molten state by raising a temperature of the resin material with the resin injection apparatus to a temperature that is greater than or equal to a first temperature;
a step of retracting the resin injection portion of the resin injection apparatus relative to the stacked core that remains pressed by the jig, after the step of injecting the resin material into the magnet holding portion, while maintaining the molten state of the resin material that is stored in the resin injection portion; and
a step of curing the resin material in the magnet holding portion, after the step of relatively retracting the resin injection portion, by heating the stacked core that has the resin material injected in the magnet holding portion and that remains pressed by the jig.

2. The rotor core manufacturing method according to claim 1, wherein the step of injecting the resin material is a step of injecting the resin material in the molten state into the magnet holding portion by the resin injection portion while a temperature of the resin material is greater than or equal to the first temperature and less than a second temperature that is greater than the first temperature, the resin material configured to melt at the first temperature and configured to cure at the second temperature, and the step of curing the resin material is a step of curing the resin material in the magnet holding portion by heating the stacked core that has the resin material injected in the magnet holding portion and that remains pressed by the jig, at the second temperature or greater, the second temperature being a temperature at which the resin material cures.

3. The rotor core manufacturing method according to claim 2, wherein the step of curing the resin material in the magnet holding portion is a step of curing the resin material in the magnet holding portion by heating the stacked core at the second temperature or greater in a curing heater apparatus that is provided separately from the resin injection apparatus.

4. The rotor core manufacturing method according to claim 2, wherein the step of injecting the resin material is a step of melting the resin material at the first temperature, and is a step of injecting the resin material in the molten state into the magnet holding portion.

5. The rotor core manufacturing method according to claim 1, wherein the step of injecting the resin material is a step of injecting the resin material into the magnet holding portion while applying pressure to the resin material such that the pressure applied to the resin material increases above a predetermined threshold as a result of filling the magnet holding portion with the resin material, and is a step of stopping injection of the resin material after maintaining the increased pressure for a predetermined period of time.

6. The rotor core manufacturing method according to claim 1, wherein the step of injecting the resin material is a step of injecting the resin material into the magnet holding portion by the resin injection portion through a hole portion provided in the jig that presses the stacked core.

7. The rotor core manufacturing method according to claim 1, wherein the step of mounting the stacked core to the jig is a step of mounting the stacked core to the jig that is provided with a thermal insulator, and the step of injecting the resin material is a step of injecting the resin material in the molten state into the magnet holding portion while the stacked core remains mounted to the jig provided with the thermal insulator.

8. The rotor core manufacturing method according to claim 1, wherein the step of relatively retracting the resin injection portion is a step of relatively retracting the resin injection portion while interrupting injection of the resin material from the resin injection portion by an interrupting portion that is provided to the resin injection portion, after injecting the resin material into the magnet holding portion by the resin injection portion.

9. The rotor core manufacturing method according to claim 1, wherein the step of injecting the resin material is a step of injecting the resin material into the magnet holding portion while applying pressure to the resin material, and the step of relatively retracting the resin injection portion is a step of relatively retracting the resin injection portion while pressure applied to the resin material is less than the pressure that is applied to the resin material in the step of injecting the resin material.

10. The rotor core manufacturing method according to claim 1, wherein the step of relatively retracting the resin injection portion is a step of relatively retracting the resin injection portion by moving the stacked core away from the resin injection portion.

11. The rotor core manufacturing method according to claim 10, wherein the step of injecting the resin material is a step of injecting the resin material into the magnet holding portion from above, and the step of relatively retracting the resin injection portion is a step of relatively retracting the resin injection portion by moving down the stacked core away from the resin injection portion.

12. The rotor core manufacturing method according to claim 1, wherein the step of mounting the stacked core to the jig is a step of mounting the stacked core to the jig such that the stacked core is held and pressed in a vertical direction between an upper plate that is included in the jig and a lower plate that is included in the jig.

* * * * *